July 7, 1959  L. C. RENFROE ET AL  2,893,019
RETRACTIBLE RUNNING GEAR FOR BOAT TRAILERS
Filed Jan. 5, 1955  2 Sheets-Sheet 1
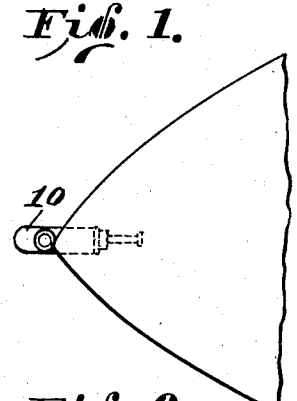
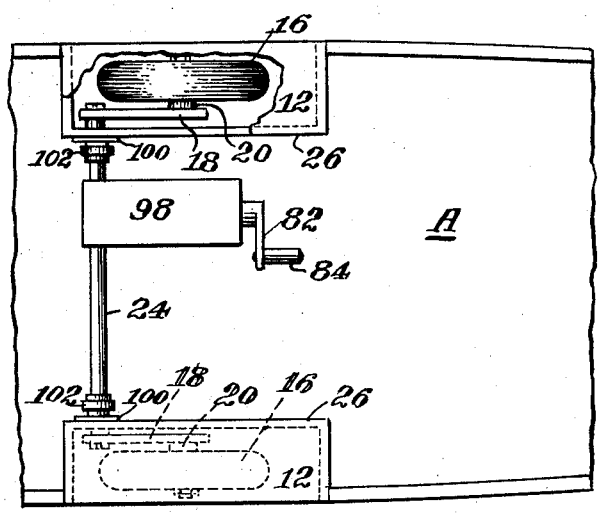
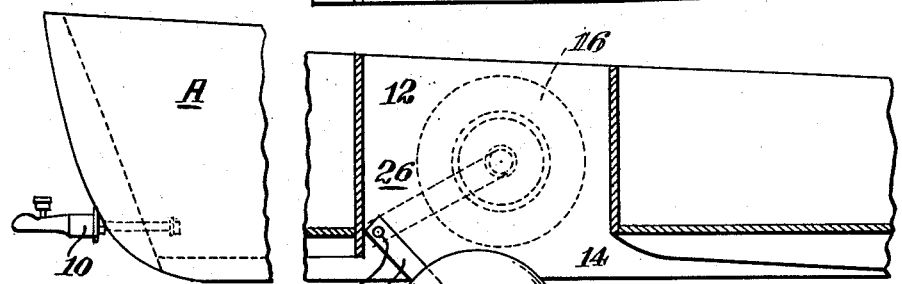
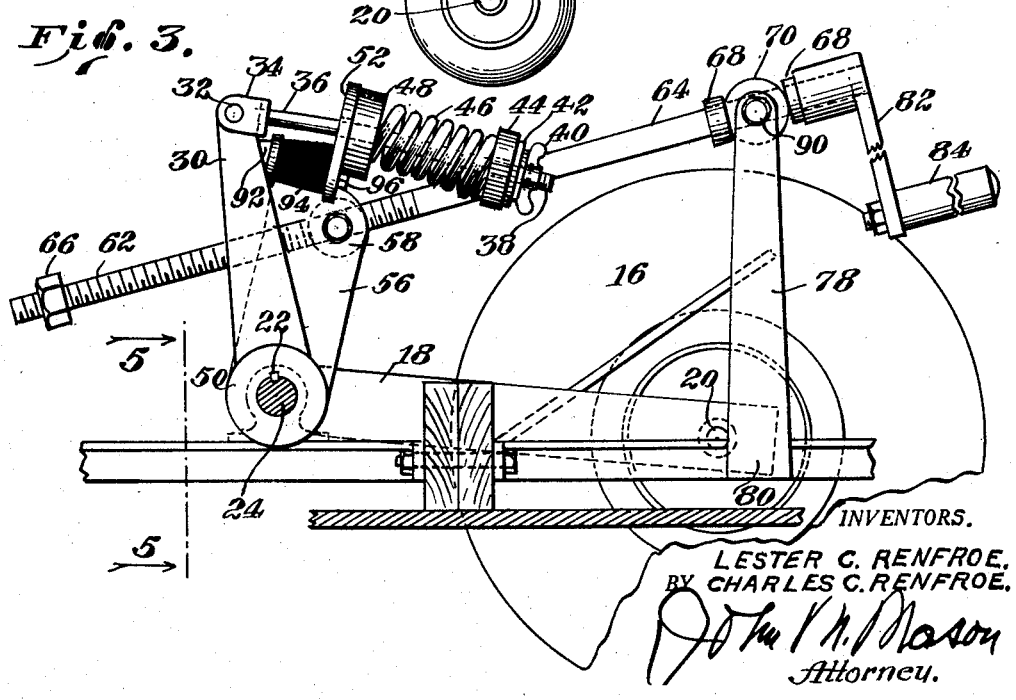
INVENTORS.
LESTER C. RENFROE,
CHARLES C. RENFROE.
BY
Attorney.

July 7, 1959 L. C. RENFROE ET AL 2,893,019
RETRACTIBLE RUNNING GEAR FOR BOAT TRAILERS
Filed Jan. 5, 1955 2 Sheets-Sheet 2
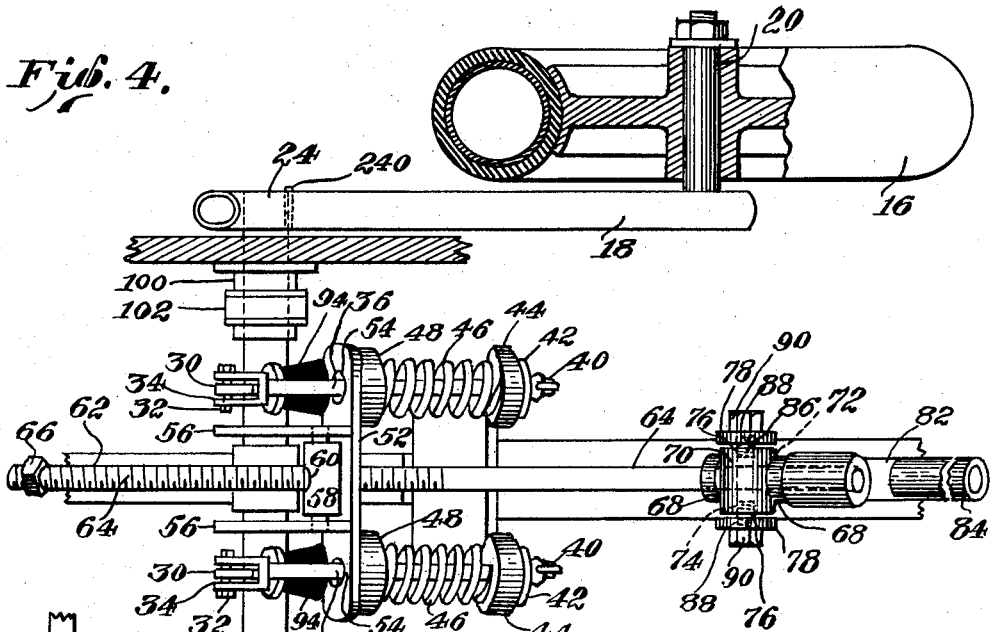
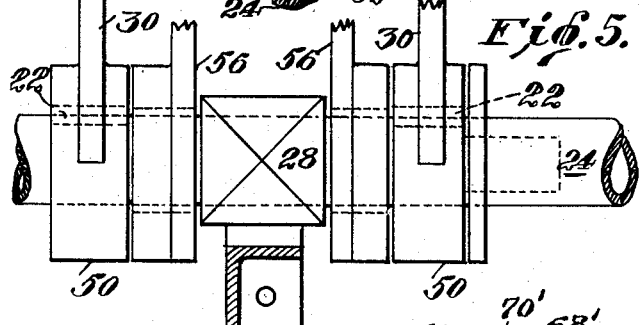
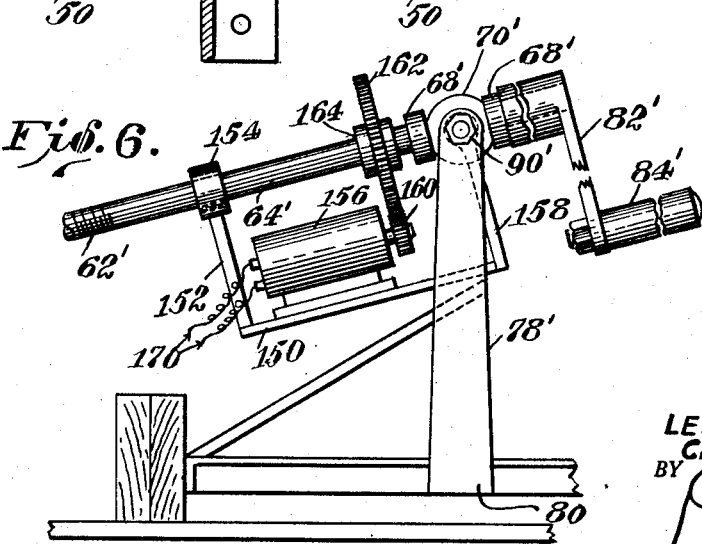
INVENTORS.
LESTER C. RENFROE.
CHARLES C. RENFROE.
BY
Attorney.

United States Patent Office 2,893,019
Patented July 7, 1959

2,893,019

RETRACTIBLE RUNNING GEAR FOR BOAT TRAILERS

Lester C. Renfroe, Jacksonville, Fla., and Charles C. Renfroe, Decatur, Ga.

Application January 5, 1955, Serial No. 479,936

2 Claims. (Cl. 9—1)

This invention relates particularly to running gear for boat trailers wherein the running gear may be retractible into wells on the side of the boat, the device of the invention being particularly adapted for use by hunters, fishermen, campers, rescue squads and by military personnel.

An object of the invention is to provide a retractible running gear for boats that consists of a minimum number of parts, and which may be operated to quickly and easily cause the running gear to move from its retracted position within wells on the boat sides to its un-retracted position with the ground supporting wheels in engagement with a road surface.

Another object is to provide novel driving means for operating the retractible mechanism, and means whereby the supporting wheels are moved to their load-supporting position by gravity.

A further object is to provide electrical drive means for driving the boat supporting retractible mechanism.

An additional object is to provide improved spring cushion means for supporting the boat during its overland transportation and while supported on a pair of wheels.

Other objects will appear hereinafter throughout the specification.

In the drawings:

Figure 1 is a top plan view of a boat, partly broken away, and showing the wheel housings or wells with one form of the operating mechanism;

Figure 2 is a side elevation of a boat partly broken away, and showing one of the ground supporting wheels in its unretracted position in full lines, and in its retracted position in dotted lines with parts of the boat shown in section;

Figure 3 is an enlarged detail view in side elevation of the operating mechanism with certain portions of the boat shown in section;

Figure 4 is a top view with parts shown in horizontal section;

Figure 5 is a front elevational view taken on the line 5—5 of Figure 3; and

Figure 6 is a side elevational view of a modified construction.

Referring to the drawings A indicates the boat as a whole. The boat is preferably provided with the usual trailer hitch 10 whereby it may be towed overland from place to place by an automotive vehicle, not shown.

Located on opposite sides of the boat are the wells or recesses 12 having open bottom portions 14, each housing having a ground engaging wheel 16 and its supporting arm 18, see Figures 1 and 2.

The arm 18 is provided with an axle 20 at one of its ends which axle rotatably supports a wheel 16. The opposite end of each supporting arm 18 is keyed at 240 as seen in Figure 4 to the ends of the rockable shaft 24 which latter extends through the sides 26 of the boat well adjacent the forward portion thereof. The rockable shaft is mounted in a suitable bearing 28 and end bearings 100. Also keyed at 22 to the collar 50 fast on shaft 24 are the rockable arms 30, the upper ends of each of which are provided with a pin 32 on which is pivoted a stirrup 34 to which is fixed at one of its ends the rod 36. The opposite end of each rod is screw threaded at 38 for receiving an internally threaded wing nut 40. The nut adjustably engages by means of its threads a washer 42 which later engages a cap 44. The cap 44 is cup-shaped on its left face as viewed in Figure 3, the cup serving as a housing for one end of the compressible spring 46. The opposite end of the spring is engaged in a cup-shaped member 48 forming part of the plate 52. This plate 52 as shown in Figure 4 forms the support for each of the cup-shaped members 48. Figure 4 also shows the rods 36 as being threaded through apertures 54 in plate 52, through apertures, not shown, in cup members 48, axially through the interior of the springs 46, and then threaded through the caps 44 and washers 42.

Vertical movements of each of the wheels 16 and of each rockable arm and supporting arm 18 that supports its wheel, is effected by a third or actuating arm 56 of which there are two, as shown in Figures 4 and 5. Each actuating arm is freely pivoted about the rockable shaft 24 at its lower end, as shown in Figure 5, and the upper arm ends are connected to each other by a yoke member 58 which rotatably engages each arm 56, as shown in Figure 3. There is a transverse threaded passageway 60 in the yoke member, which aperture is threadedly engaged by the threads 62 of the control rod 64, whose lower end is provided with a stop nut 66.

It will be understood that the rotation of the rod is for the purpose of controlling the position of the ground engaging wheels 16.

As seen in Figures 3 and 4, a pair of spaced collars 68 are mounted on the control rod. These collars are rigidly mounted on the rod by welding or other suitable means. Between the collars is a spool member 70 having a cylindrically smooth passageway 72 as shown in dotted lines in Figure 4, whereby the rod 64 may freely slide in said passageway.

The rod 64 is rotatably and slidably supported on said spool member due to the provisions of recesses 74 in the opposite ends of the spool member, and pins 76 which engage these recesses. These pins are each mounted on a stationary arm 78 whose lower end 80 is rigidly mounted in the boat bottom as shown in Figure 3. The upper end of the rod 64 has rigidly mounted thereon by a key or other suitable means, not shown, a crank arm 82, the free end of which is provided with a handle 84, whereby upon rotation of the crank arm 82 by the handle 84 the control rod 64 may be rotated in either direction of rotation. It will be noted that each pin 76 has a screw threaded portion 86 that engages a screw threaded recess 88 in the arm 78 and said pin has a hexagonal portion 90 for tightening the pin in fixed spool-engaging position whereby said pins may hold the spool as shown in Figure 4. The pins may be removed by means of a wrench when dismantling the apparatus.

Each rockable arm 30 is provided with an abutment 92 beneath its pivot pin 32. This abutment is engageable by the rubber bumper 94 that is attached to its actuating arm 56 by a bolt or rivet 96 as shown in Figure 3.

As shown in Figure 1, the principal parts of the raising and lowering mechanism are located within the casing 98. The rockable shaft 24 is provided with suitable bearings and seals as shown diagrammatically at 100 and 102 respectively in Figures 1 and 4.

The means for retracting the running gear and for moving the running gear into operative position as thus far described may be operated by turning the handle 84, so as to rotate the control rod in opposite directions. When this rod is rotated in a direction to cause the actuating arm 56 to rotate on shaft 24 in a counterclockwise direction, as viewed in Figure 3, and with the parts in the position as shown in this figure, the bumpers 94 engage the rockable arms 30 and cause them to rotate in the same direction. These arms 30 lift the wheel-supporting arms 18 and wheels 16 into the wells 12, the operating being discontinued when the parts reach the dotted line position shown in Figure 2.

The full line position of all parts as shown in Figures 2 and 3 is attained by rotating the handle 84 in the opposite direction, i.e., so as to cause the parts to rotate with the shaft 24 to a position where the wheels 16 are in ground engaging position. During the movement of the several parts to this position, as the actuating arms 56 move clockwise about the shaft 24, plate 52, which is rigidly connected with the upper ends of said arms, also moves clockwise. Such movement permits arms 30, wheel-supporting arms 18 and the ground wheels supported thereby to move by gravity to their ground engaging position, the amount of movement being governed by the extent to which arm 56 is moved clockwise by control rod 64.

When the wheels 16 are in proper position [and such position may vary according to how high it is desired to support the boat above the surface of the road on which it is to be towed], the boat is in a position for towing. During movement of the boat over a road surface, should a depression or "pot-hole" in the road be encountered, the wheel which falls into such depression moves upwardly, causing arms 18 and 30 to move in a counter clockwise direction with relation to the shaft 24. Such movement causes the rod 36 to move to the left as seen in Figure 3. Inasmuch as the arms 56 and the plate 52 are held in a stationary position, as adjusted by rod 64, caps 44 as as moved by springs 46, move toward cup-shaped members 48, thus compressing springs 48 between the movable caps 44 and stationary cup members 48. The springs therefore form a cushioning or shock-absorber means for the wheels as they move over the ground. After the depression has been passed over, the parts assume their normal position, the springs 48 expanding to cause a return movement of the parts.

It will be further appreciated that the heavier the weight of the boat and its contents becomes, due to the fact that the boat has been in the water for some time and has absorbed water, or because the boat has been loaded with camping equipment, the more the springs will be compressed even when the road surface over which the boat passes is comparatively smooth. Under this condition, i.e., where the weight is greater than normal, the springs will be even more compressed each time depressions in the road surface are encountered.

When the boat is moved into the water, the wheels are caused to be elevated as shown in dotted lines in Figure 3.

Referring to Figure 6, reference numeral 150 is a frame which is suspended by an arm 152 to a bushed hub 154 mounted on shaft 64'. The numeral 156 is an electric motor having leads 170 that may be connected to a suitable source of electrical potential. The other side of the frame is supported by an arm 158 which is connected to either the standard 78' or the member 70. The motor 156 drives gear 160 which drives driven gear 162 that is splined to the shaft by means of a feather 164.

It will be appreciated that the motor 156 is reversible by suitable switch means, not shown, whereby shaft 164 may be driven in either direction. The source of electrical potential may be the battery of the towing vehicle or any other electrical source.

The above description and drawings disclose several embodiments of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

We claim:

1. In a boat having retractable wheels, the combination of a boat having a plurality of side walls, wells in said side walls, a rockable shaft extending into each of said wells, a supporting arm mounted on each end of said shaft in said wells, a ground engaging wheel secured to each of said arms, a pair of rockable arms having their lower extremities affixed to said shaft, third arm means having its lower extremity rotatably mounted on said shaft, resilient means connecting the upper extremities of said third arm means and said rockable arms, said resilient means further including a plate affixed to said third arm means, a rod means having one of its ends pivotally connected to each of said rockable arms, an abutting member adjustably engaging said rod means, a compressible spring being mounted on the end of said rod means between said plate and said abutting member, screw threaded means connected to said third arm means, means for actuating said screw threaded means to rotate said third arm means on said rockable shaft, and vary the tension on said spring, said rockable arms being adapted to be urged by screw threaded means through said resilient means and to rotate said rotatable shaft and move said wheels in varying positions.

2. In a boat having retractable wheels, the combination of a boat having a plurality of side walls, wells in said side walls, a rockable shaft extending into each of said wells, a supporting arm mounted on each end of said shaft in said wells, a ground engaging wheel secured to each of said arms, a pair of rockable arms having their lower extremities affixed to said shaft, third arm means having its lower extremity rotatably mounted on said shaft adjacent said rockable arms, resilient means connecting the upper extremities of said third arm means and said rockable arms, said resilient means further comprising a plate affixed to said third arm means, a rod means having one of its ends pivotally connected to each of said rockable arms, an abutting member adjustably engaging said rod means, a compressible spring being mounted on the end of said rod means between said plate and said abutting member, screw threaded means connected to said third arm means, means for actuating said screw threaded means to rotate said third arm means on said rockable shaft, and vary the tension on said spring, said rockable arms being adapted to be urged by screw threaded means through said resilient means and to rotate said rotatable shaft and move said wheels in varying positions.

References Cited in the file of this patent

UNITED STATES PATENTS

| 1,747,563 | Yonkers | Feb. 18, 1930 |
| 2,453,388 | Schramm | Nov. 9, 1948 |
| 2,457,567 | Kuns | Dec. 28, 1948 |
| 2,587,624 | Johnson | Mar. 4, 1952 |
| 2,640,706 | Kuster | June 2, 1953 |

FOREIGN PATENTS

| 649,243 | Great Britain | Jan. 24, 1951 |